(12) United States Patent  (10) Patent No.: US 7,755,836 B2
Harris et al.  (45) Date of Patent: Jul. 13, 2010

(54) IMAGING SYSTEM AND METHOD TO CHANGE FIELD DEPTH

(75) Inventors: Rodney C. Harris, Fort Collins, CO (US); Kurt E. Spears, La Jolla, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1294 days.

(21) Appl. No.: 11/261,731

(22) Filed: Oct. 27, 2005

(65) Prior Publication Data
US 2007/0097446 A1    May 3, 2007

(51) Int. Cl.
G02B 27/10 (2006.01)

(52) U.S. Cl. ..................................................... 359/619
(58) Field of Classification Search .......... 359/619–626
See application file for complete search history.

(56) References Cited

U.S. PATENT DOCUMENTS 6,826,422 B1 * 11/2004 Modell et al. ............... 600/407
2005/0135798 A1 * 6/2005 Szajewski et al. ........... 396/335

* cited by examiner

*Primary Examiner*—Alicia M Harrington (57) ABSTRACT

An imaging system comprises a masking element configured to mask a predetermined quantity of lens elements of a lens array during a scan of a media object to change a depth of field of the lens array.

34 Claims, 6 Drawing Sheets

FIG. 8

IMAGING SYSTEM AND METHOD TO CHANGE FIELD DEPTH

BACKGROUND OF THE INVENTION

Scanning systems are used in a variety of different applications and products, such as copiers, facsimile machines, and scanners. However, different types of scanning media generally result in different types of scanning problems. For example, scanned locations near the spine of a bound volume often appear darker, blurry, and text thereat more compressed, than in adjacent locations because of distance variations between a focal plane of the scanning system and an object plane associated with the portion of the object being scanned. Thus, scanned media readability varies as a result of non-uniformities or variations in the object plane location.

BRIEF DESCRIPTION OF THE DRAWINGS

For a more complete understanding of the present invention and the advantages thereof, reference is now made to the following descriptions taken in connection with the accompanying drawings in which.

DETAILED DESCRIPTION OF THE DRAWINGS

The preferred embodiments of the present invention and the advantages thereof are best understood by referring to FIGS. 1-8 of the drawings, like numerals being used for like and corresponding parts of the various drawings.

Figure 1:
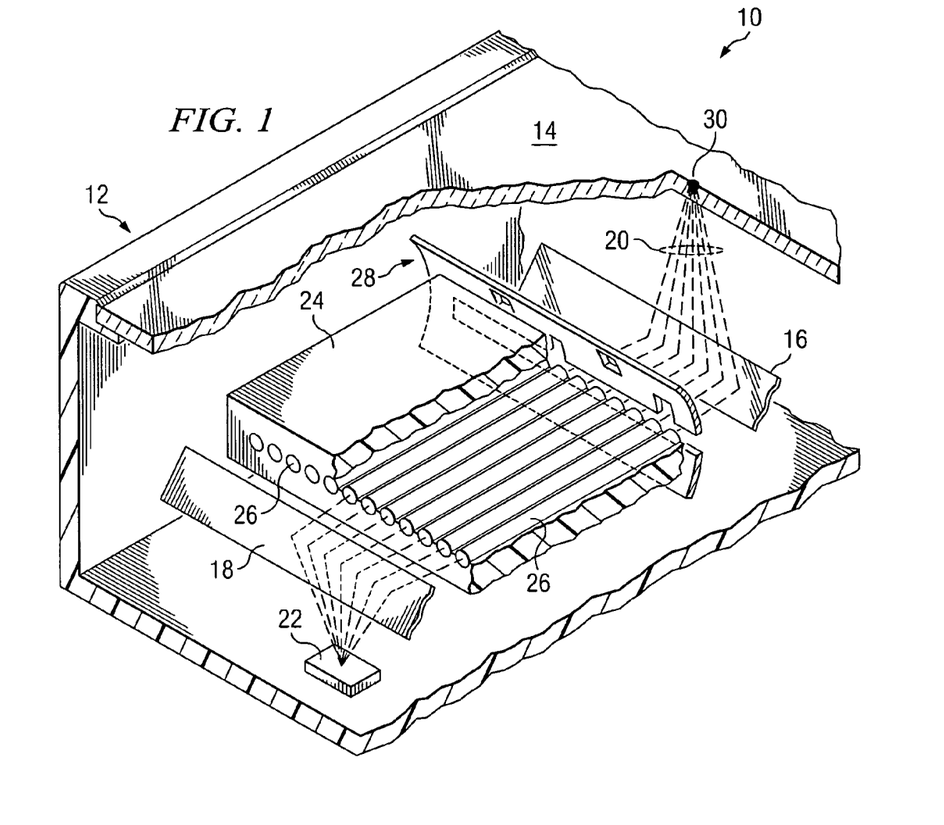
FIG. 1 is a diagram illustrating a portion of an embodiment of an imaging system with changeable depth of field in accordance with the present invention.
Figure 2:
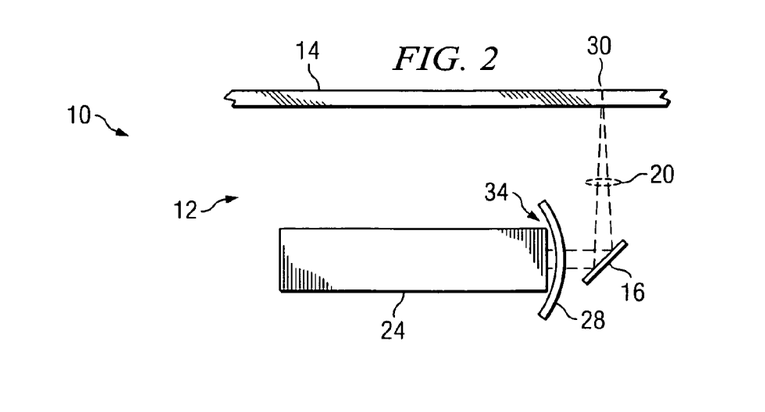
FIG. 2 is a diagram illustrating a side view of a portion of the imaging system of FIG. 1.

FIG. 1 is a diagram illustrating an embodiment of an imaging system 10 with a portion broken away having a changeable and/or selectively increasable depth of field in accordance with the present invention, and FIG. 2 is a diagram illustrating a side view of a portion of imaging system 10 of FIG. 1. In the embodiment illustrated in FIGS. 1 and 2, imaging system 10 comprises a scanner device 12 having a platen 14 for receiving an object to be imaged, reflectors 16 and 18 for reflecting optical signal(s) 20 from the imaged object to a photosensor element 22, a lens array 24 having a plurality of lens elements 26 for focusing the optical signal(s) 20 onto photosensor element 22, and a masking element 28.

In the embodiment illustrated in FIGS. 1 and 2, scanner device 12 is configured having a compact form such that reflectors 16 and 18 are used to change a direction of optical signal(s) 20 from vertical to horizontal relative to platen 14, and then from horizontal to vertical relative to photosensor element 22. However, it should be understood that scanner device 12 may be manufactured having a greater or fewer quantity of reflectors, including no reflectors (e.g. a vertical arrangement of lens array 24 and photosensor 22 where optical signal(s) 20 are directed from platen 14 through lens array 24 and onto photosensor element 22 without needing reflecting elements). Scanner device 12 may comprise any type of device for generating a scanned image including, but not limited to, a flatbed scanner, copier, multifunction or facsimile machine.

Masking element 28 is used to selectively block and/or otherwise render inactive particular lens elements 26 of lens array 24 to change and/or increase a depth of field of scanner device 12 to accommodate changes in distance between an object plane corresponding to an object to be imaged and a focal plane of scanner device 12. For example, scanning devices with lens arrays generally have a short depth of field having a focal plane generally coincident with a surface of a platen. However, if a distance between an object to be imaged and the platen changes (e.g., a binding of a book or a slide), the scanned image of the object becomes less focused at least because the focal object plane does not coincide with a surface of the object to be imaged. Additionally, because optical signals corresponding to a particular point or location (e.g., location 30 of FIG. 1) at the focal object plane pass through a plurality of lens elements 26 to form an image of the object at photosensor element 22, a change in the distance between the imaged object and the focal plane causes a blurring or smearing of the image formed at photosensor element 22 (e.g., at least because of the incident angle of the optical signals 20 being focused on photosensor element 22). For example, in operation, multiple lens elements 26 contribute to form an image on photosensor element 22. However, of the multiple lens elements 26 forming an image on photosensor element 22 corresponding to point 30, generally only a single lens element 26 is in alignment with point 30. Thus, for the lens elements 26 that are not generally aligned with point 30, the angle of the optical signal 20 impinging against photosensor element 22 for each lens element 26 contributing to form the image at photosensor element 22 increases as a distance between the respective non-aligned lens element 26 and the aligned lens element 26 increases. Thus, as a distance between the object plane and the focal plane increases, the angular differences of the impinging optical signal(s) 20 used to form the image cause a blurring and/or smearing of the image formed on photosensor element 22.

Embodiments of the present invention selectively block and/or otherwise render inactive particular lens elements 26 during scanning of an object using masking element 28 to change and/or increase a depth of field of scanner device 12. For example, in operation, masking element 28 is used to selectively render particular lens elements 26 inactive during different scans of the object to minimize and/or substantially reduce the detrimental angular effects of the optical signal(s) 20 used to form an image of the object on photosensor element 22. Accordingly, the image formed on photosensor element 22 by the active lens elements 26 comprises an increased field depth. In operation, multiple scans of the object are obtained, each having different lens elements 26 rendered inactive. The multiple scanned images are used and/or otherwise combined to form an overall scanned image of the object. In the embodiment illustrated in FIGS. 1 and 2, masking element 28 is disposed at a receiving end 34 of lens array 24 between reflector 16 and lens array 24. However, it should be understood that masking element 28 may be otherwise located relative to lens array 24 to render particular lens elements 26 inactive for a particular scan.

Figure 3:
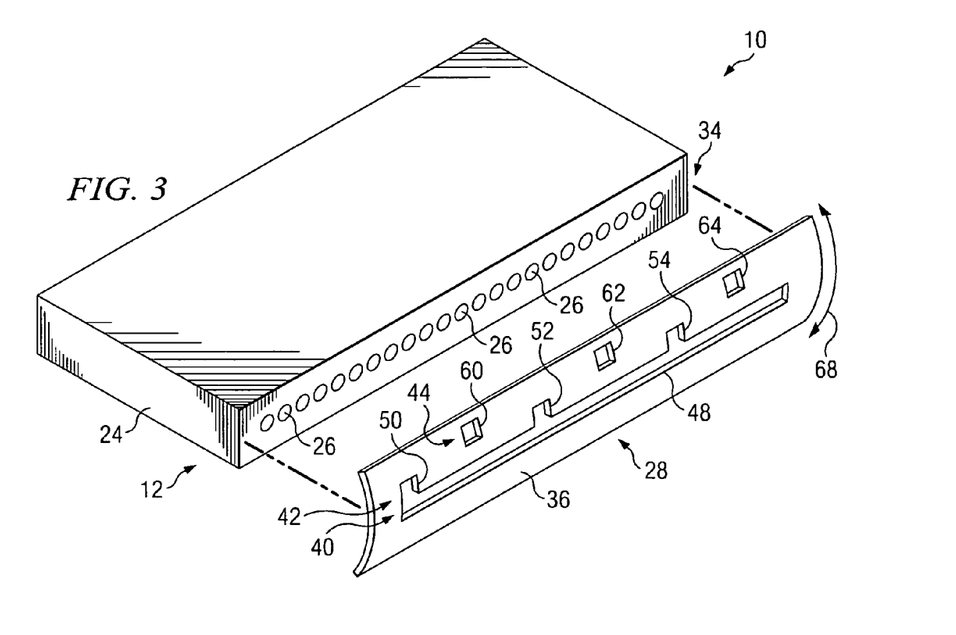
FIG. 3 is a diagram illustrating an embodiment of a masking element of the imaging system of FIG. 1 in accordance with the present invention.

FIG. 3 is a diagram illustrating a perspective view of an embodiment of masking element 28 in accordance with the present invention. In the embodiment illustrated in FIGS. 1-3, masking element 28 comprises a mechanical shutter 36 movable into different positions relative to lens array 24 to selectively block and/or render particular lens elements 26 inactive during a particular scan of a media object. For example, in the embodiment illustrated in FIG. 3, mechanical shutter 36 comprises three masking modes based on three different positions of mechanical shutter 36 relative to lens array 24. For example, mechanical shutter 36 comprises a first mask position and/or mode 40, a second mask position and/or mode 42, and a third mask position and/or mode 44. In mask mode 40, mechanical shutter 36 is positioned relative to lens array 24 such that an opening 48 formed in mechanical shutter 36 is aligned with receiving end 34 of lens elements 26 and extends across all lens elements 26, thereby rendering all lens elements 26 active and/or unblocked during a scanning operation (e.g., during a normal scanning operation where the object plane of the imaged object is coincident with a focal plane of imaging device 12). In mask mode 42, mechanical shutter 36 is positioned relative to lens array 24 such that openings 50, 52 and 54 formed in mechanical shutter 36 are aligned with receiving end 34 of lens elements 26 such that lens elements 26 aligned with openings 50, 52 and 54 are active during a scan of a media object using mask mode 42 while a remainder of lens elements 26 not aligned with openings 50, 52 or 54 are rendered inactive and/or blocked. In mask mode 44, mechanical shutter 36 is positioned relative to lens array 24 such that openings 60, 62 and 64 formed in mechanical shutter 36 are aligned with receiving end 34 of lens elements 26 such that lens elements 26 aligned with openings 60, 62 and 64 are active during a scan of the media object in mask mode 44 while a remainder of lens elements 26 not aligned with openings 60, 62 and 64 are rendered inactive and/or blocked. In operation, mechanical shutter 36 is moved in the direction generally indicated by 68 relative to lens array 24 to locate mechanical shutter 36 in a desired mask mode 40, 42 or 44 during a particular scan of a media object. It should be understood that the quantity of mask modes of mechanical shutter 36 may be otherwise varied and/or configured.

In some embodiments of the present invention, imaging device 12 is configured to receive input from a user (e.g., via a user interface) indicating a type of media object to be imaged, a desired field depth for scanning the media object, or other type of information that indicates particular mask modes for generating a scanned image of the object. It should also be understood that in some embodiments of the present invention, imaging device 12 is configured to automatically detect the type of media object or otherwise automatically determine particular mask modes for scanning of the media object. Thus, in operation, if an object plane of the media object generally coincides with a focal plane of imaging device 12, mask mode 40 is used to scan the media object (e.g., lens array 24 remains unmasked). If an increased depth of field for scanning a particular media object is selected or otherwise automatically determined, a first scan of the media object is performed with mechanical shutter 36 in mask mode 42, and a second scan of the media object is performed with mechanical shutter 36 in mask mode 44.

Scanning of the media object with mechanical shutter 36 in mask modes 42 and 44 may be performed using a variety of methods. For example, in some embodiments of the present invention, an entire scan of the media object is performed with mechanical shutter 36 in mask mode 42, and another scan of the entire media object is performed with mechanical shutter 36 in mask mode 44. Alternatively, mechanical shutter 36 may be alternated between mask modes 42 and 44 at each scan line of the media object. Thus, in each mask mode, a reduced quantity of lens elements 26 are used to form an image of the object at photosensor element 22, thereby reducing and/or substantially minimizing the "smearing" and/or "blurring" effect that may otherwise be caused by the increasing incident angle of optical signal(s) 20 impinging on photosensor element 22 from particular lens elements 26. In operation, the images formed using mask modes 42 and 44 are combined and/or otherwise each contribute to an overall scanned image of the object. In the above example, two mask modes 42 and 44 are used to form the overall image of the media object with an increased field depth. However, it should be understood that additional mask modes may be used and the resulting scanned images combined and/or used in combination with the scanned images from mask modes 42 and 44 to form the overall image.

Figure 4A:
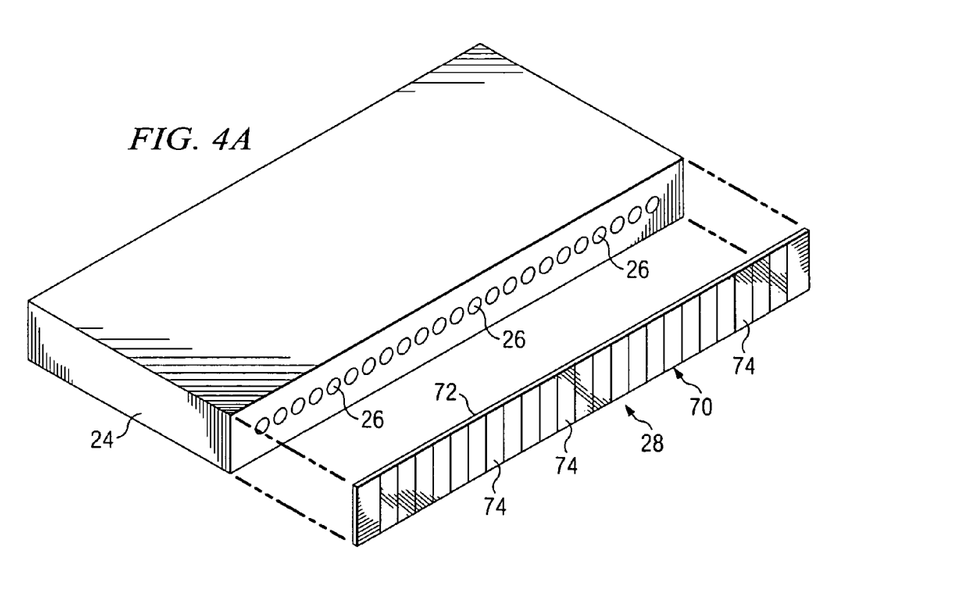
FIGS. 4A and 4B are diagrams illustrating another embodiment of a masking element in accordance with the present invention.
Figure 4B:
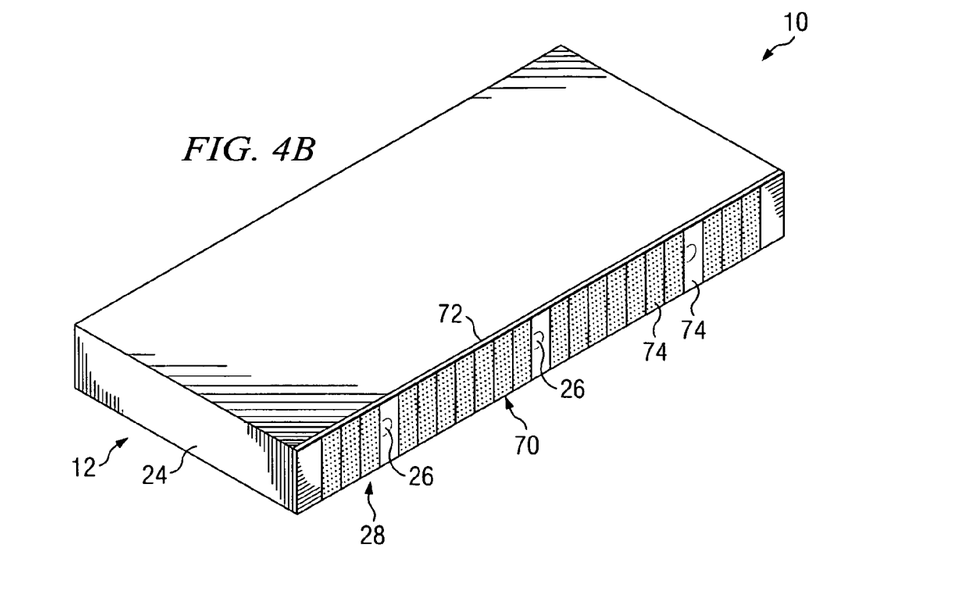

FIGS. 4A and 4B are diagrams illustrating an alternate embodiment of masking element 28 in accordance with the present invention. In the embodiment illustrated in FIGS. 4A and 4B, masking element 28 comprises an electronic shutter 70. For example, in some embodiments of the present invention, electronic shutter 70 comprises a liquid crystal display (LCD) 72 having a plurality of LCD elements 74 disposed in alignment with lens elements 26 such that LCD elements 74 are separately actuatable between a transparent and non-transparent state to selectively render respective lens elements 26 active and inactive, respectively, during each scan of the media object. Thus, in the embodiment illustrated in FIGS. 4A and 4B, electronic shutter 70 is electronically actuatable to obtain different mask modes for rendering different combinations of lens elements 26 inactive during each scan of the media object.

Figure 5A:
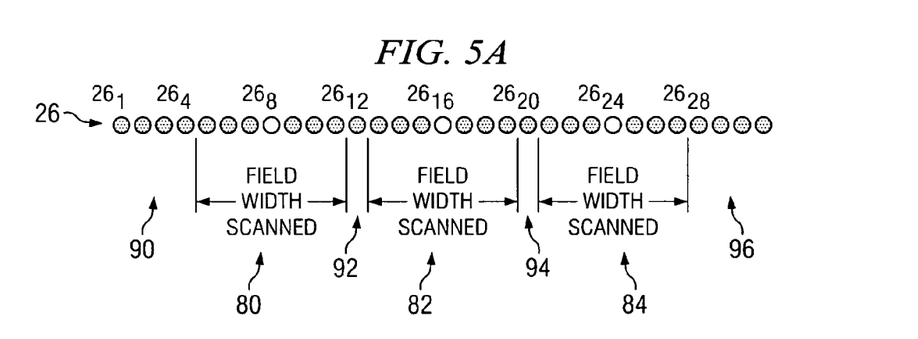
FIGS. 5A and 5B are diagrams illustrating field of view patterns using two different mask modes of an imaging system in accordance with the present invention.
Figure 5B:
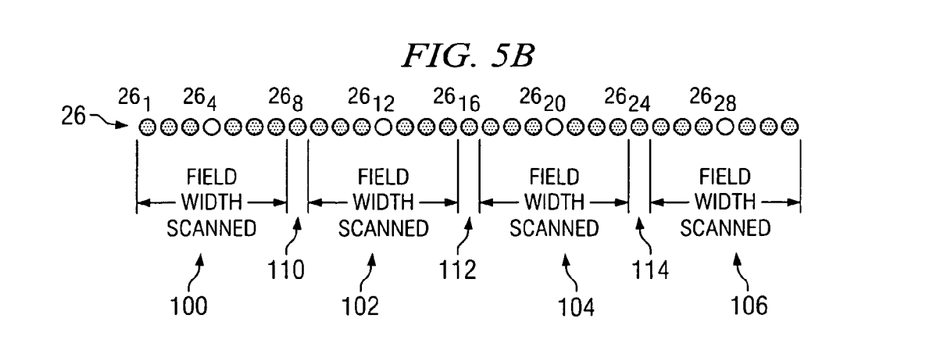

FIGS. 5A and 5B are diagrams illustrating a viewable field width of particular lens elements 26 in different active/inactive states corresponding to two different mask modes in accordance with the present invention. For example, referring to FIG. 5A, lens elements $26_8$, $26_{16}$ and $26_{24}$ are active and/or unblocked during a particular mask mode while a remainder of lens elements 26 are rendered inactive and/or blocked. As illustrated in FIG. 5A, active lens elements $26_8$, $26_{16}$ and $26_{24}$ form an image on photosensor element 22 having a field width visible by respective lens elements $26_8$, $26_{16}$ and $26_{24}$ corresponding and/or otherwise indicated generally by 80, 82 and 84, respectively. In the embodiment illustrated in FIG. 5A, portions of the total field relative to the imaged object are not visible and correspondingly not scanned during the mask mode of FIG. 5A (e.g., the portions indicated by 90, 92, 94 and 96).

Referring to FIG. 5B, a mask mode different than the mask mode illustrated in FIG. 5A is used to scan a media object such that a different combination of lens element(s) 26 are rendered active during scanning of a media object than those rendered active in FIG. 5A. For example, in FIG. 5B, lens elements $26_4$, $26_{12}$, $26_{20}$ and $26_{28}$ are rendered active while remaining lens elements 26 are rendered inactive and/or blocked. As illustrated in FIG. 5B, a field width viewable and correspondingly scanned by each active lens element $26_4$, $26_{12}$, $26_{20}$ and $26_{28}$ is indicated generally by 100, 102, 104 and 106, respectively. Correspondingly, portions of the object not within a field width viewable by active lens elements $26_4$, $26_{12}$, $26_{20}$ and $26_{28}$ are indicated generally by 110, 112 and 114. Preferably, particular lens elements 26 are selected to be active and/or inactive for each scanning mode such that a different combination of lens elements 26 is selected for each masking mode to compensate for portions of the media object outside the field viewable by the respective active lens elements 26. For example, as illustrated in FIGS. 5A and 5B, portions 90, 92, 94 and 96 of FIG. 5A falling outside a viewable field of the active lens elements $26_8$, $26_{16}$ and $26_{24}$ during the mask mode of FIG. 5A are within the viewable field of active lens elements $26_4$, $26_{12}$, $26_{20}$ and $26_{28}$ in the mask mode of FIG. 5B.

Thus, preferably, different combinations of lens elements 26 are selected for each mask mode to cover the entire field width of the media object. It should also be understood that in some embodiments of the present invention, particular lens elements 26 may be active in more than a single mask mode (e.g., lens elements 26 located near the ends or sides of lens array 24 may be active for each mask mode or multiple mask modes). In the example illustrated in FIGS. 5A and 5B, the active lens elements 26 are equally spaced apart in a single mask mode (e.g., as illustrated in FIG. 5A), and have an equal corresponding spacing in another mask mode (e.g., as illustrated in FIG. 5B). However, it should be understood that the spacing or interval of active/inactive lens elements 26 may be otherwise varied for a single mask mode and/or between different mask modes. Further, in the embodiment illustrated in FIGS. 5A and 5B, the active/inactive lens elements 26 for each mask mode are configured to be complementary to each other (e.g., having the same active/inactive lens element 16 spacing and offset by a factor of the spacing). However, it should be understood that the different combinations of active/inactive lens elements 26 for each mask mode may be otherwise configured.

Figure 6A:
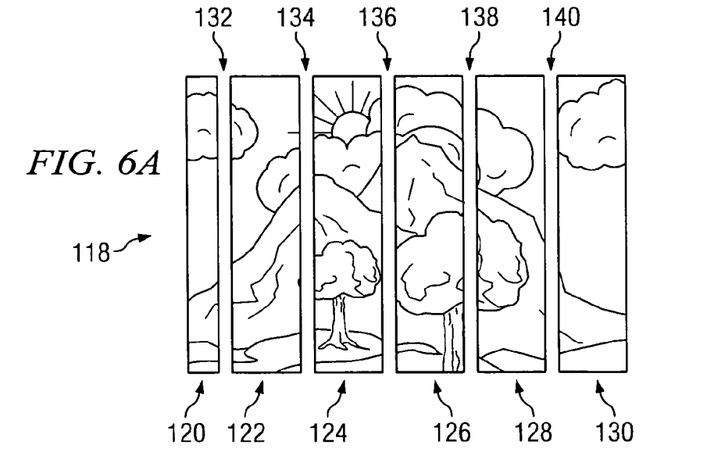
FIGS. 6A and 6B are diagrams illustrating scanned images using two different mask modes in accordance with the present invention.
Figure 6B:
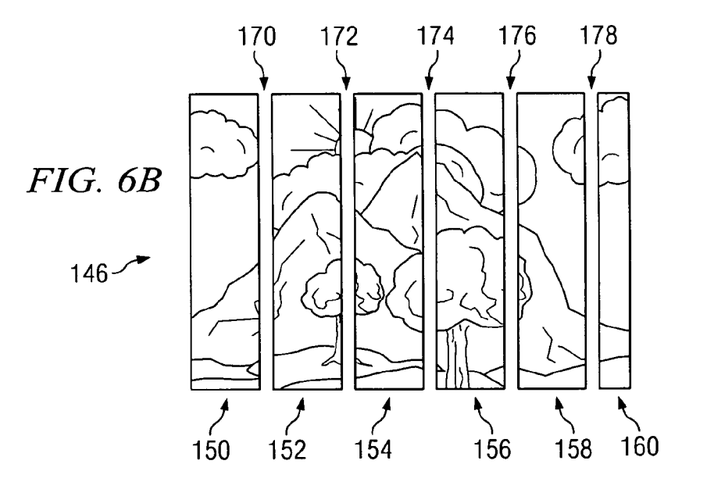
Figure 6C:
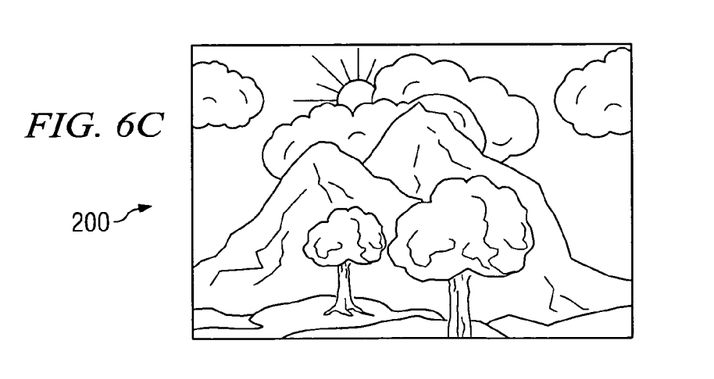
FIG. 6C is a diagram illustrating a scanned image formed using the scanned images of FIGS. 6A and 6B.

FIGS. 6A and 6B are diagrams illustrating a respective scanned image corresponding to two different mask modes in accordance with the present invention, and FIG. 6C is a diagram illustrating an overall image of a scanned object resulting from combining the scanned images of FIGS. 6A and 6B for the respective mask modes of FIGS. 6A and 6B in accordance with the present invention. Referring to FIG. 6A, a scanned image 118 comprises portions 120, 122, 124, 126, 128, and 130 corresponding to a width of field visible by active lens elements 26 during a particular mask mode of masking element 28. As illustrated in FIG. 6A, portions 132, 134, 136, 138, and 140 correspond to portions outside the visible field of active lens elements 26 during a scan of the media object in the particular mask mode of FIG. 6A. Referring to FIG. 6B, a scanned image 146 comprises portions 150, 152, 154, 156, 158 and 160 corresponding to width of fields visible by active lens elements 26 during the mask mode of FIG. 6B. As illustrated in FIG. 6B, the scanned image comprises portions 170, 172, 174, 176 and 178 corresponding to width of fields not visible by active lens elements 26 in the mask mode of FIG. 6B. As illustrated in FIGS. 6A and 6B, combinations of lens elements 26 are preferably selected for each mask mode such that the respective scanned images of each mask mode, when combined, yield all portions of the media object falling within the respective width of fields visible to respective active lens elements 26. In operation, an overall image 200 (FIG. 6C) is formed by combining portions of the images illustrated in FIGS. 6A and 6B. For example, in operation, portions 120, 122, 124, 126, 128 and 130 visible to active lens elements 26 during the mask mode of FIG. 6A are combined and/or otherwise used in combination with portions 150, 152, 154, 156, 158 and 160 the visible during a scan using the mask mode of FIG. 6B to form overall image 200 (FIG. 6C).

Figure 7:
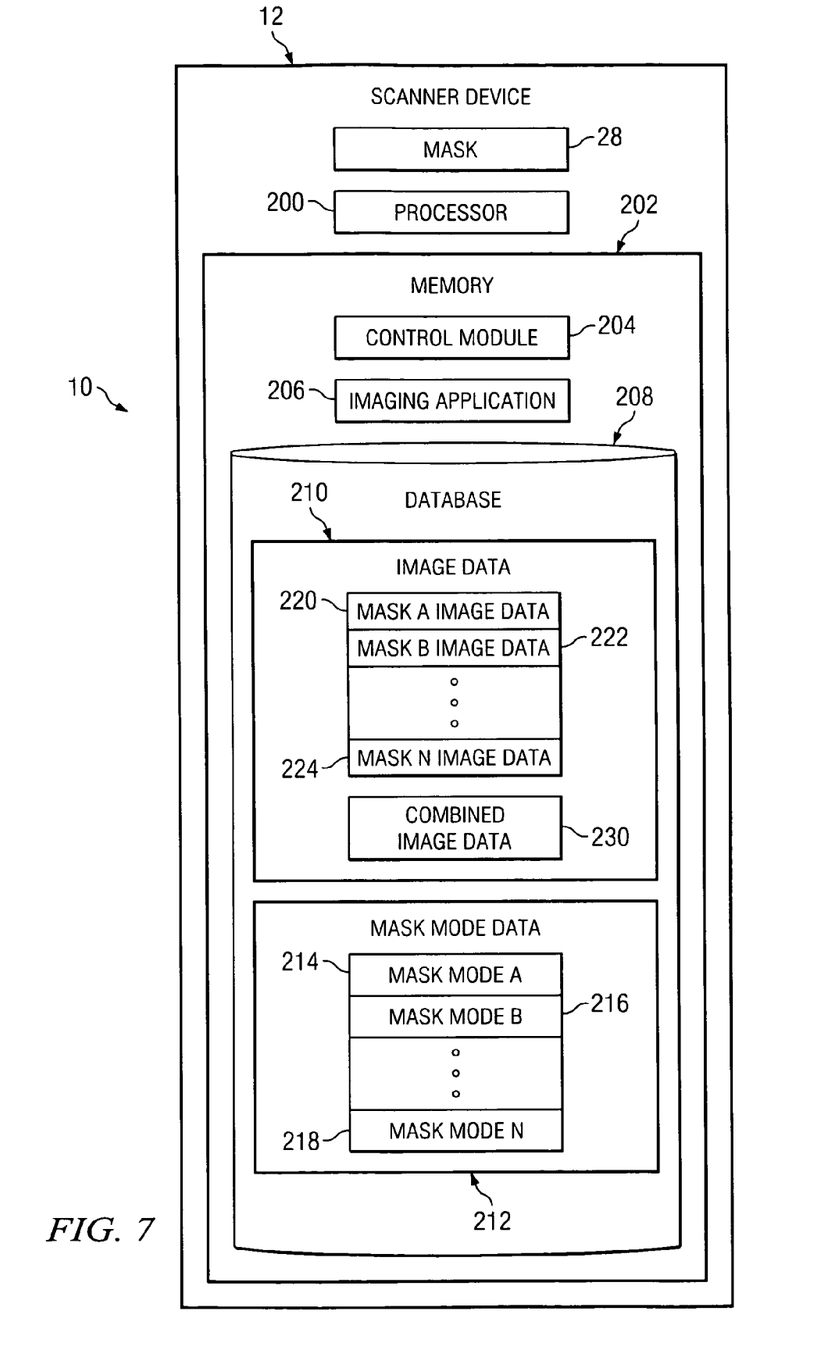
FIG. 7 is a block diagram illustrating an embodiment of an imaging system with changeable depth of field in accordance with the present invention.

FIG. 7 is a block diagram illustrating an embodiment of system 10 in accordance with the present invention. In the embodiment illustrated in FIG. 7, scanner device 12 comprises a processor 200 and a memory 202 having a control module 204 and an imaging application 206. Control module 204 and imaging application 206 may comprise hardware, software, or a combination of hardware and software. In the embodiment illustrated in FIG. 7, control module 204 and imaging application 206 are illustrated as being stored in memory 202 so as to be accessible and executable by processor 200. However, it should be understood that control module 204 and/or imaging application 206 may be otherwise stored.

In operation, control module 204 controls actuation of masking element 28 for rendering different combinations of lens elements 26 of lens array 24 active during each respective mask mode for scanning a media object (e.g., movement of mechanical shutter 36 or actuation of electronic shutter 70). Image information acquired during scanning of the media object during each mask mode is stored in a database 208 as image data 210. It should also be understood that image data 210 may comprise information associated with and/or otherwise acquired during pre-scan and/or calibration scans. In the embodiment illustrated in FIG. 7, database 208 comprises mask mode data 212 having information associated with each available and/or configured mask mode such as, but not limited to, the quantity and/or particular lens elements 26 to be rendered active/inactive during a respective scan of a media object. In some embodiments of the present invention, mask mode data 212 also comprises information associated with correlating particular mask modes with particular and/or desired field depths. For example, in some embodiments of the present invention, different mask modes having different quantities and/or combinations of active/inactive lens elements 26 correspond to different field depths. Thus, in operation, for example, for a particular type or media object, particular mask modes are used to obtain a field depth corresponding to the type of media object. In the embodiment illustrated in FIG. 7, mask mode data 212 comprises mask mode A data 214 comprising information associated with a mask mode A of masking element 28, mask mode B data 216 comprising information associated with a mask mode B of masking element 28, through mask mode N data 218 comprising information associated with a mask mode N of masking element 28 where "N" represents a total quantity of available and/or configured mask modes.

In the embodiment illustrated in FIG. 7, image data 210 comprises mask A image data 220 corresponding to image data acquired by photosensor element 22 during a scan of a media object during mask mode A 214 having particular lens elements 26 of lens array 24 active, mask B image data 222 corresponding to image data acquired during a scan of the media object during a mask mode B 216 having a different combination of lens elements 26 active, through mask N image data 224 corresponding to image data acquired during a scan of the media object during mask mode N 218. In the embodiment illustrated in FIG. 7, image data 210 also comprises combined image data 230 representing an overall image of the scanned media object by using and/or otherwise combining mask A image data 212, mask B image data 214 and/or through mask N image data 216. It should be understood that image data 220, 222 through 224 may also comprise pre-scan and/or calibration information acquired corresponding to each scan (e.g., scanning a calibration strip using a particular mask mode or otherwise).

Thus, in operation, control module 24 is used to actuate masking element 28 into different mask modes 212 to render different combinations of lens elements 26 active and/or inactive during different scans of a media object. Imaging application 206 combines image data 210 acquired during each scan in each mask mode to form combined or overall image 230 of the media object.

Figure 8:
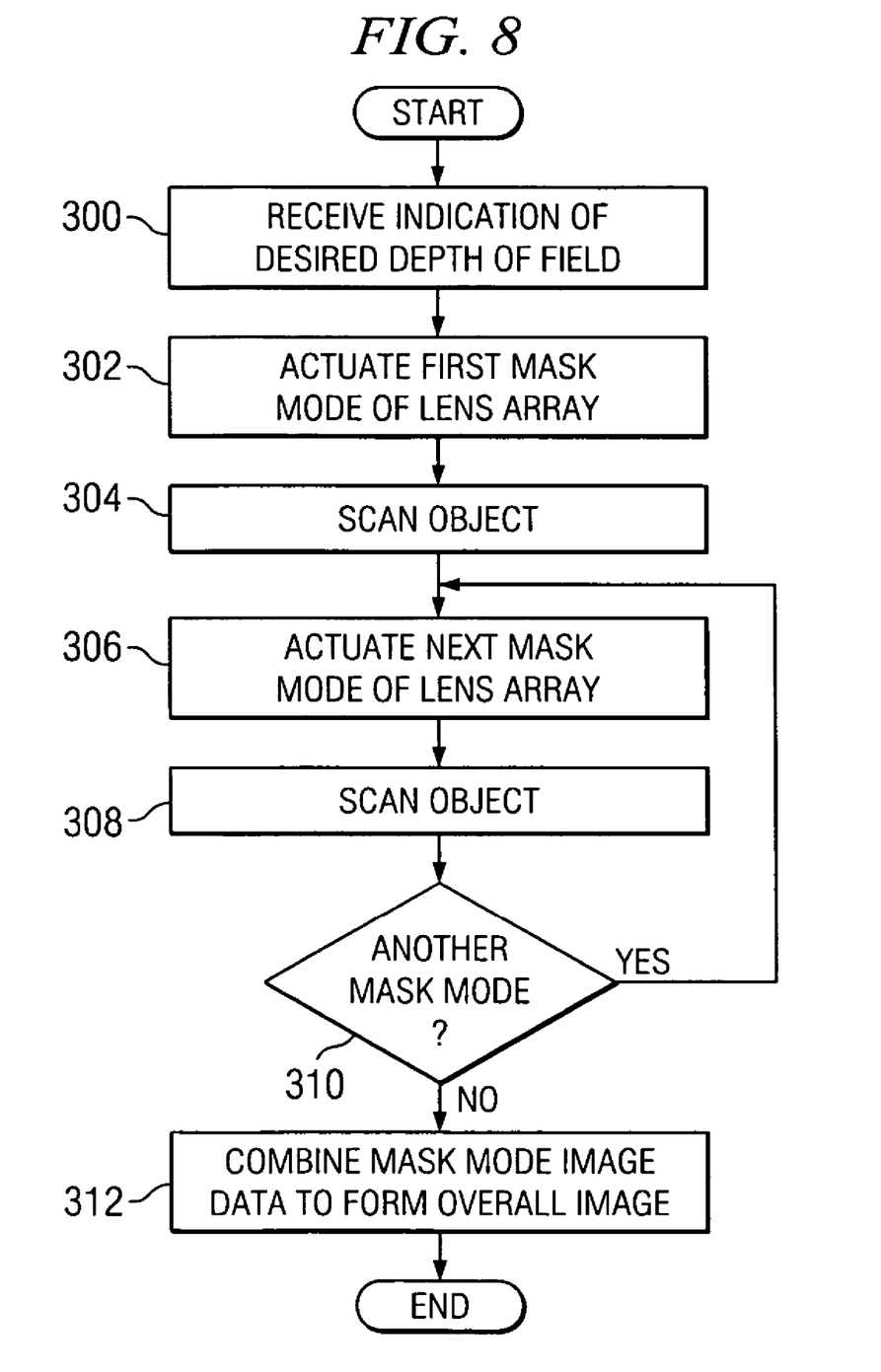
FIG. 8 is a flow diagram illustrating an embodiment of an imaging method with changeable depth of field in accordance with the present invention.

FIG. 8 is a flow diagram illustrating an imaging method embodiment with selectively increased field depth in accordance with the present invention. The method begins at block 300, where scanner device 12 receives an indication of a desired depth of field (e.g., in response to a user input indicating a type of media object, automatic detection of the type of media object, etc.). For example, in some embodiments of the present invention, scanner device 12 is configured having an interface for receiving from a user an indication of a desired depth of field and/or type of object to be imaged (e.g., a slide or other type of object where an increased depth of field is desired). It should be understood that if an increased field depth is not indicated or selected (e.g., where the object plane of the media object is coincident with a focal plane of imaging device 12), a scan of the media object is performed without masking any lens elements 26. In response to an indication for an increased field depth, the method proceeds to block 302, where control module 204 actuates masking element 28 to a first mask mode 212 of lens array 24 by rendering particular lens elements 26 of lens array 24 active and other lens elements 26 of lens array 24 inactive and/or blocked. At block 304, control module 24 initiates a scan of the media object. At block 306, control module 204 actuates masking element 28 to a next mask mode 212 of lens array 24 by rendering a different combination of lens elements 26 active and a remaining combination of lens elements 26 inactive and/or blocked. At block 308, control module 204 initiates a scan of the media object using the mask mode of block 306.

At decisional block 310, a determination is made whether another scan of the media object is to be performed in another mask mode. For example, in some embodiments of the present invention, additional mask modes having different combinations of active and inactive lens elements 26 may be used to form an overall image of the media object. If another scan of the media object with another mask mode is to be performed, the method proceeds to block 306. If another scan of the media object using another mask mode is not to be performed, the method proceeds to block 312, where imaging application 206 combines image data 210 acquired during scanning of the media object using each mask mode 212 and forms an overall image 230 of the media object.

Thus, embodiments of the present invention enable field of depth variations for scanning different types of media objects and/or other imaging-related applications by masking particular lens elements 26 of lens array 24 during different scans and combining the respective scans to form an overall image of the scanned object.

What is claimed is:

1. An imaging system, comprising:
a masking element configured to mask one or more first lens elements of a plurality of lens elements of a lens array during a scan of a media object to change a depth of field of the scan of the media object, the masking element further configured to not mask one or more second lens elements of the lens elements of the lens array during the scan of the media object,
wherein the masking element is adapted to mask at least two different combinations of lens elements of the lens array.

2. The system of claim 1, wherein the masking element comprises a mechanical shutter.

3. The system of claim 1, wherein the masking element comprises an electronic shutter.

4. The system of claim 1, wherein the masking element comprises a liquid crystal display (LCD).

5. The system of claim 1, wherein the masking element is disposed between the lens array and the media object.

6. The system of claim 1, further comprising a control module configured to actuate the masking element.

7. The system of claim 1, wherein the masking element is configured to render at least one lens element of the lens array inactive during a scan of the media object.

8. The system of claim 1, further comprising an imaging application configured to combine at least two scanned images of the media object each obtained with a different combination of lens elements masked.

9. The system of claim 1, further comprising a control module configured to actuate the masking element to at least two mask modes, at least one of the mask modes having a combination of lens elements masked different from a combination of lens elements masked for another of the mask modes.

10. An imaging method, comprising:
masking one or more first lens elements of a plurality of lens elements of a lens array of a scanning device during a scan of a media object to change a depth of field of the scan of the media object, such that one or more second lens elements of the lens elements of the lens array are not masked during the scan of the media object,
wherein masking comprises alternately masking at least two different combinations of lens elements of the lens array for two different scans of the media object.

11. The method of claim 10, wherein masking comprises rendering the first lens elements inactive during the scan.

12. The method of claim 10, further comprising masking a complementary combination of lens elements of the lens array for another scan of the media object.

13. The method of claim 10, further comprising actuating a mechanical shutter to mask the first lens elements.

14. The method of claim 10, wherein masking the first lens elements comprises actuating a masking element disposed between the lens array and the media object.

15. The method of claim 10, wherein masking the first lens elements comprises actuating an electronic masking element.

16. The method of claim 10, wherein masking the first lens elements comprises actuating a plurality of elements of a liquid crystal display (LCD).

17. The method of claim 10, further comprising combining at least two scanned images of the media object each obtained with a different combination of lens elements masked.

18. An imaging system, comprising:
a lens means for focusing an optical signal onto a photosensitive element for generating a scanned image of a media object;
means for masking one or more first lens elements of a plurality of lens elements of the lens means during a scan of the media object to change a depth of field of the scan of the media object, such that the means does not mask one or more second lens elements of the lens elements of the lens array during the scan of the media object; and
means for combining at least two scanned images of the media object, each scanned image obtained using a different combination of lens elements of the lens means masked.

19. The system of claim 18, wherein the masking means comprises means for masking at least two different combinations of lens elements of the lens means.

20. The system of claim 18, wherein the masking means comprises an electronic means for masking the first lens elements.

21. The system of claim 18, wherein the masking means is disposed between the lens means and the media object.

22. An imaging system, comprising:
    a masking element adapted to render inactive at least two different combinations of lens elements of a lens array; and
    an imaging application configured to combine at least two different scanned images of a media object to create an overall image of the media object, each scanned image corresponding to a different combination of masked lens elements.

23. The system of claim 22, wherein the masking element comprises a mechanical shutter.

24. The system of claim 22, wherein the masking element is disposed between the lens array and the media object.

25. The system of claim 22, wherein the masking element comprises an electronic shutter.

26. The system of claim 22, wherein the masking element comprises a liquid crystal display (LCD).

27. The system of claim 22, further comprising a control module configured to alternately actuate the masking element to render inactive respective combinations of lens elements.

28. The system of claim 22, wherein at least two of the different combinations of masked elements are complementary to each other.

29. An imaging method, comprising:
    masking at least two different combinations of lens elements of a lens array; and
    combining at least two different scanned images of a media object to create an image of the media object, each scanned image corresponding to a different combination of masked lens elements.

30. The method of claim 29, wherein masking comprises alternately masking each of the different combinations of lens elements at each scan line of a scanning operation.

31. The method of claim 29, wherein masking comprises actuating a shutter disposed between the lens array and the media object.

32. The method of claim 29, wherein masking comprises actuating an electronic shutter.

33. The method of claim 29, wherein masking comprises masking at least two different complementary combinations of lens elements of the lens array.

34. The method of claim 29, wherein masking comprises masking at least two different combinations of lens elements such that respective scanned images of the media object using each of the two different combinations have overlapping visible fields.

* * * * *